Patented Dec. 20, 1932

1,891,843

UNITED STATES PATENT OFFICE

CECIL SHAW, OF GRANGEMOUTH, AND JOHN THOMAS, OF POLMONT, SCOTLAND, ASSIGNORS TO IMPERIAL CHEMICAL INDUSTRIES LIMITED, A CORPORATION OF GREAT BRITAIN

PRODUCTION OF HALOGENATED PHTHALIC ANHYDRIDE

No Drawing. Application filed March 13, 1931, Serial No. 522,523, and in Great Britain March 14, 1930.

This invention relates to the production of derivatives of phthalic anhydride.

It relates especially to the production of halogen derivatives, particularly chloro derivatives of phthalic anhydride or of its derivatives.

The invention relates to a process for the treatment of nitro-substituted phthalic anhydride compounds with halogens, whereby the nitro substituent or substituents are replaced by halogen with the production of halogenated phthalic anhydride compounds.

The invention also relates to a process according to the preceding paragraph in which the reaction is carried out at a temperature at which the starting material is molten.

The invention also consists in a process in which nitro derivatives of phthalic anhydride are treated with chlorine at temperatures of about 240° C.

The invention also consists in a process for the production of 3-chloro-phthalic anhydride from 3-nitro-phthalic anhydride by processes according to any of the preceding paragraphs.

The invention also consists of processes for the production of derivatives of phthalic anhydride substantially as herein described.

The invention also consists in products such as may be made by the processes herein described either when so made or when made by any obvious chemical equivalent of these processes.

The invention is illustrated but not limited by the three examples following. The quantities are given in parts by weight.

Example 1

50 parts of 3-nitro-phthalic anhydride are heated in an enamelled pan first until they melt and then until the temperature rises to 240° C. A stream of chlorine gas is then passed through the liquid at about 240° C. until the evolution of brown fumes ceases. Air is then blown through the molten mass and the liquid run out and allowed to cool. It solidifies to a white solid consisting substantially of 3-chloro-phthalic anhydride.

Example 2

A mixture of 3- and 4-nitro-phthalic anhydrides is treated in the same way as in Example 1. The product consists apparently of a mixture of 3-chloro-phthalic anhydride and 4-chloro-phthalic anhydride. These two bodies may be separated in the form of their acids by recrystallization from water from which the 3-chloro compound can be obtained as white crystals while the 4-chloro isomeride remains in solution.

Example 3

500 parts of mononitro-4:5-dichlorophthalic anhydride (obtained by the nitration of 4.5-dichlorophthalic anhydride in nitric acid with addition of sulphuric acid) are melted in an enamelled pan and the temperature taken up to 240° C. A steady current of chlorine is then passed through until evolution of brown fumes has totally ceased. The stream of chlorine is then stopped and the molten product heated for a further 2 hours to drive off excess chlorine. The melt is then poured out, allowed to cool and solidify and then powdered.

The product consists of trichlorophthalic anhydride.

General

One advantage of the process lies in the fact that in some cases it is difficult to obtain chloro derivatives of phthalic anhydride directly, especially is this so with 3-chlorophthalic anhydride; on the other hand, 3-nitro-phthalic anhydride is quite readily obtained, so that our process is a convenient one for the production of 3-chloro-phthalic anhydride. This is a valuable dyestuff intermediate, especially for the production of benzoyl-benzoic acids.

As many apparently widely different embodiments of this invention may be made without departing from the spirit thereof, it is to be understood that we do not limit ourselves to the foregoing examples or description, except as indicated in the following patent claims.

We claim:

1. Process for the production of halogenated phthalic anhydride which comprises reacting nitro-substituted phthalic anhydride with a halogen until at least one nitro group is replaced by a halogen atom.

2. Process for the production of halogenated phthalic anhydride which comprises reacting molten nitro-substituted phthalic anhydride with a gaseous halogen.

3. Process for the production of chlorinated phthalic anhydride which comprises reacting nitro-derivative of phthalic anhydride with chlorine at about 240° C.

4. Process for the production of 3-chlorophthalic anhydride which comprises reacting 3-nitrophthalic anhydride with chlorine at about 240° C.

5. In the manufacture of halogenated phthalic anhydride from nitro-substituted phthalic anhydride, the process which comprises heating nitro phthalic anhydride until it becomes molten, further heating the molten substance and passing a current of gaseous halogen through the hot molten substance until the evolution of brown fume ceases, removing the excess of the halogen and cooling the halogenated phthalic anhydride thus obtained to solidify it.

6. The process of claim 5 in which the hot molten substance is maintained at about 240° C.

7. The process of claim 5 in which said gaseous halogen is chlorine gas.

8. In the manufacture of 3-chlorophthalic anhydride, the process which comprises heating 3-nitro phthalic anhydride until it is melted, further heating the molten mass to a temperature of about 240° C., passing a current of chlorine gas through the hot molten substance until the evolution of brown fume ceases, then passing a current of air through the molten mass to remove the excess chlorine and cooling the 3-chlorophthalic anhydride thus produced to solidify it.

9. In the manufacture of chlorophthalic anhydride the process which comprises heating a mixture of 3- and 4-nitrophthalic anhydride until they are melted, further heating the molten mass to about 240° C., passing a current of chlorine gas through the hot molten material until the evolution of brown fume ceases, blowing air through the hot molten reaction products to remove excess chlorine, cooling the reaction mass to solidify it, and then separating the 3-chloro compounds from the 4-chloro compounds by recrystallization from water in the form of their acids, the 3-chloro compounds being obtained as white crystals while the 4-chloro compounds remain in solution.

10. In the manufacture of chloro-phthalic anhydride the process which comprises nitrating 4:5-dichlorophthalic anhydride in nitric acid with the addition of sulphuric acid, heating the mono-nitro-4:5-dichlorophthalic anhydride thus obtained until it is melted, further heating the molten substance to about 240° C., passing a current of chlorine through the hot molten substance until the evolution of brown fumes ceases, discontinuing the current of chlorine, heating the molten reaction product thus obtained to remove the excess chlorine and then cooling the tri-chlorophthalic anhydride thus obtained to solidify it.

In testimony whereof we affix our signatures.

CECIL SHAW.
J. THOMAS.